United States Patent [19]

Ojala

[11] 4,231,842
[45] Nov. 4, 1980

[54] RECOVERY OF THERMAL ENERGY FROM A THERMOMECHANICAL PULP PLANT

[75] Inventor: Pertti Ojala, Turku, Finland

[73] Assignee: Valmet Oy, Finland

[21] Appl. No.: 913,327

[22] Filed: Jun. 7, 1978

[30] Foreign Application Priority Data

Dec. 22, 1977 [FI] Finland .................. 773916

[51] Int. Cl.³ .................. D21B 1/12; D21F 5/20
[52] U.S. Cl. ..................... 162/47; 162/207
[58] Field of Search .......... 162/47, 28, 207, 290; 34/35, 86; 241/28

[56] References Cited

U.S. PATENT DOCUMENTS

| | | | |
|---|---|---|---|
| 3,988,200 | 10/1976 | Smith, Jr. ............. | 162/290 |
| 3,988,201 | 10/1976 | Smith, Jr. ............. | 162/290 |
| 4,111,743 | 9/1978 | Rönnholm ............. | 162/47 X |
| 4,138,311 | 2/1979 | Neno ................... | 162/28 |

OTHER PUBLICATIONS

Torsten Simmons, "Varmeater vinning vid T-massaabriken i Braviken", *Svensk Papperstidning*, vol. 10, 1977.

*Primary Examiner*—Richard V. Fisher
*Attorney, Agent, or Firm*—Steinberg and Blake

[57] ABSTRACT

A method of recovering the thermal energy contained in the pressurized steam utilized during the production of thermomechanical pulp. The steam is applied to the primary side of a heat exchanger with water supplied to the secondary side in order to produce hot water. The water is vaporized to produce clean steam. The clean steam is then utilized to at least a first steam group of the drying sections of a paper manufacturing machine without increasing the pressure of the clean steam.

11 Claims, 2 Drawing Figures

RECOVERY OF THERMAL ENERGY FROM A THERMOMECHANICAL PULP PLANT

BACKGROUND OF THE INVENTION

This invention relates to thermomechanical pulp production, and more specifically to a method of recovering the thermal energy from the pressurized process steam generated during the production of thermomechanical pulp.

Wood pulping techniques based upon chemical or mechanical procedures are well known. Recently a new mechanical wood pulping procedure has been developed. This procedure is based upon the well known fact that long, flexible and undamaged fibers can be produced by softening the lignin with heat. Utilizing the new pulping procedure, a new mechanical pulp quality is produced which is referred to as thermomechanical pulp. One of the benefits of utilizing this new mechanical procedure is that the total pulp output approximately equals the quantity of wood fed into the process.

One of the major drawbacks of thermomechanical pulp production is that a considerable amount of heat is wasted during the process. This heat is in the form of steam which is generated during thermomechanical pulp production. The wasted heat may exceed 80% of the electrical energy used in the process. With an increase in the use of thermomechanical pulp plants, and with the simultaneous increase in the cost and availability of energy resources, there has been an increase in the need to recover the wasted heat and in this way recover the thermoenergy produced during the thermomechanical pulp process.

In a typical thermomechanical pulp plant, there is provided two high pressure refining phases. The refining pressure is approximately 1.5 to 3.5 bars (abs.) with the temperature approximately equal to the temperature of the saturated steam in each of the refining phases.

In the thermomechanical pulp process, wood chips are first scrubbed with water and are fed with a plug screw or a sluice feeder to a pressurized preheater where chips are heated with steam. From the preheater, the chips are then fed by additional screw mechanisms to a first refining stage. After refining, steam and fibre material are separated with a first phase cyclone.

From the first phase cyclone the pulp is fed by means of screws to a secondary refining stage after which the pulp and steam are again separated with a second phase cyclone. The pulp is then directed to a pumping container where it is suitably diluted and from which it is pumped to a sorting mechanism. The pulp is now available as ready made raw material for use in a paper manufacturing machine.

When such a typical thermomechanical pulp process is utilized in the manufacture of news print, the quantity of waste heat generated is approximately 2,000 kWh of energy per one ton of pulp. Of this, approximately 1.2 tons of steam is generated during the primary refining process and approximately 1.0 tons of steam is generated during the secondary refining process.

The steam which leaves during the course of the thermomechanical pulp process does so through threee different outlets. The steam produced during the primary refining process can leave partly from the first phase cyclone and part from the preheater. The steam produced during the secondary refining process can leave partly from the first phase cyclone and partly from the second phase cyclone. The quality of steam is different from the point of view of its air content, inert gas, and mechanical and chemical contaminants contained therein such as the fibres. The temperature of the atmospheric steam is approximately 98° to 99° C.

It should also be noted that a large quantity of the thermal energy created during the thermomechanical pulp productions leaves in the form of "dirty" low pressure process steam.

It is therefore appreciated that a large amount of thermal energy is wasted during the course of the thermomechanical pulp process and such energy leaves in the form of the steam utilized during the process. As a result, there have been attempts to recover such heat in various types of recovery systems where the atmospheric steam generated during this process is utilized to provide heat in various other situations. For example, such heat recovery systems utilize the steam as a remote heating source for housing developments, for heat ventilation air and/or sanitary water, as well as to preheat combustion and/or drying air of a paper manufacturing machine.

Because of heat recovered at other points of the paper manufacturing process, the amount of the heat which is needed in a typical paper mill is much lower than the volume of heat generated in the production of thermomechanical pulp. Since thus far there has been no way to utilize this heat economically, the generated steam is generally blown toward the ambient atmosphere which again increases heat losses and lowers the profitability of the process.

It has been previously suggested that the process steam produced during the thermomechanical pulp process should be utilized for the drying section in the paper manufacturing machine itself. However, when such process steam is directly applied to the drying section, since the process steam contains various contaminants including mechanical and chemical contaminants as well as uncondensed gasses, corrosion will result on the thermal surfaces in the drying sections. At the same time, contaminants will accumulate on these surfaces and make heat transfer more inefficient.

According to a recent suggestion by Torsten Simmons, *Varmeatervinning vid T-massaabriken i Braviken,* Svensk Papperstidning, No. 10,1977, the thermal energy of the process steam of a thermomechanical pulp plant can be utilized be sending it to a heat exchanger whereby the heat energy is utilized to vaporize clean water. At that point it has been suggested that the pressure of the clean steam produced is then raised by approximately 0.5 bar with a compressor. After this, the high pressurized steam is utilized in the dryer section of the paper machine. However, one of the problems with this suggested procedure is that the use of the compressor and the raising of the vapour pressure adds additionally to the cost of the recovery system and also requires additional energy consumption in order to achieve the recovery objectives.

SUMMARY OF THE INVENTION

Generally speaking, in accordance with the present invention, there is provided a method for recovering the thermal energy contained in the pressurized process steam generated by a plant during the production of thermomechanical pulp. The energy is recovered by utilizing the process steam in the drying sections of a paper manufacturing machine with the following process. The process steam is applied to the primary side of a heat exchanger. Water is supplied to the secondary side of the heat exchanger whereby hot water is produced. The water is then vaporized to provide clean steam. The clean steam is then utilized to at least a first steam group of the drying sections of the paper manufacturing machine without increasing its pressure.

Accordingly, it is an object of the present invention to provide a recovery system for the thermal energy in a thermomechanical pulp process which does not require the need for increasing the pressure of the steam.

A further object of the present invention is to provide a method of recovering thermal energy contained in pressurized steam in the production of a thermomechanical pulp procedure by utilizing the process steam to produce clean steam which can be applied to the drying sections of a paper manufacturing machine without the need for compressing such clean steam.

A further object of the present invention is to provide an improved method of recovering the thermal energy contained in the pressurized process steam generated in the production of thermomechanical pulp by utilizing such steam in conjunction with other steam generating equipment for the drying sections of a paper manufacturing machine.

A further object of the present invention is to recover the thermal energy contained in pressurized steam generated in the production of thermomechanical pulp by utilizing the energy to supply clean steam wherein such clean steam is only compressed for specific high pressure stages of the drying sections of the paper manufacturing machine.

Still other objects and advantages of the invention will, in part, be obvious and will, in part, be apparent from the specification.

The invention accordingly comprises the features of construction, combination of elements, and arrangements of parts which will be exemplified in the construction hereinafter set forth and the scope of the invention will be indicated in the claims.

BRIEF DESCRIPTION OF DRAWINGS

For a fuller understanding of the invention, reference is had to the following description taken in conjunction with the accompanying drawings in which.

DESCRIPTION OF PREFERRED EMBODIMENTS

Figure 1:
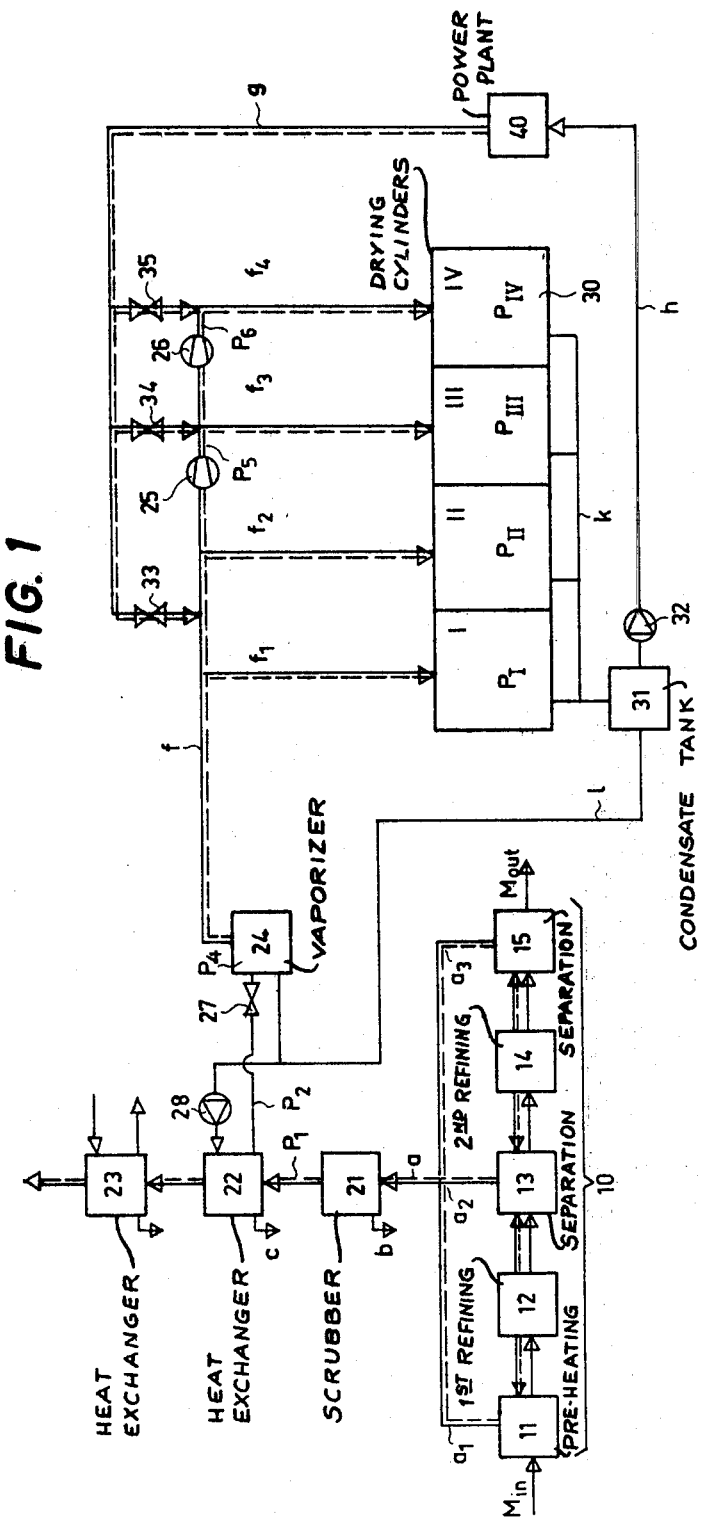
FIG. 1 schematically represents a block diagram of a thermomechanical pulp plant and a drying section of a paper manufacturing machine as well as their thermomechanical interconnection.

Referring now to the Figure, the thermomechanical pulp process shown generally at 10 receives chips at the input $M_{in}$ and produces the pulp output at $M_{out}$. The process includes the necessary equipment which carries out the steps of preheating of the chips as shown at block 11, followed by the first refining phase at block 12. The pulp and steam is separated at block 13 following the first phase, whereupon it enters into the second refining phase 14. Finally, at block 15 is the separation of the pulp and steam after the second phase. Although not shown, the pulp may still pass through additional processes such as a receiving and cleaning phase, and part of the pulp may pass through a reject refining phase. After that, the pulp is ready for use as raw material in a paper manufacturing machine.

The flow path of the steam is shown by means of a solid line and a broken line. The solid line indicates the steam that is generated and moves along with the flow of the pulp, while the broken line indicates the steam flowing back and moving against the direction of the pulp. Steam is generated in the refining phases 12 and 14. From these phases the steam is either conveyed along with the pulp, or at least part of the steam moves in the direction against the pulp. As a result, steam can leave through the outlet point 11 representing the preheating cycle, as well as the separation points 13 and 15. From these three outlets a1, a2 and a3, the steam flows along line a to the steam scrubber 21. With a pressure p1, it then flows to the heat exchanger 22. Other heat exchangers, shown by the additional exchanger 23, may continue along in order to condense the rest of the steam.

In the exemplary embodiment shown in the figure, steam is taken out of the thermomechanical pulp process with a high pressure p1=2 bar (abs.). The thermal energy of this steam at the high pressure p1 is brought to the heat exchanger 22 and the thermal energy therefrom is transferred to clean water which is circulated by means of the pump 28. The clean water moves from the heat exchanger to the vaporizer 24. A feedback path from the vaporizer permits flow back to the heat exchanger. Between the heat exchanger 22 and the vaporizer 24 there is included a pressure reduction valve 27. In the vaporizer 24 the clean water is removed as a lower pressure steam of approximately p4=1.2 bar (abs.).

The drying section of the paper manufacturing machine is generally indicated by reference numeral 30. Typically, it comprises two rows of drying cylinders one on top of the other between which the paper web runs in a zig zag fashion. In the dryer section shown, there are four steam feeding groups designated I, II, III and IV each with a corresponding pressure $p_I \ldots p_{IV}$. Steam generated in the vaporizer 24 as a result of the conversion of thermal energy from the process steam is fed into the cylinders of the dryer section 30 of the paper machine through the line f. The line f is subdivided into the four branches: f1, f2, f3 and f4, each of which respectively direct part of the steam into the groups I . . . IV of the drying section 30. The pressure of the clean steam p4 at the beginning of the line f is approximately 1.2 bar.

As is known, in the first drying section of the paper manufacturing machine, the cylinder temperature and consequently the steam pressure, is lower than in the subsequent drying sections. By way of example, the steam pressure of the various cylinders in the drying sections can be typically $P_I=0.8$ bar; $P_{III}=1.8$ bar and $P_{IV}=2.0$ bar. As a result, the steam fed through the lines f1 and f2 to the first and second steam groups can be fed directly. Within these steam groups themselves, the pressure p4 can be adjusted to the desired level with adjusting instruments inherent in the steam groups themselves. Thus, the pressure of the clean steam at 1.2 bar can be reduced to the appropriate level for the group I cylinders and applied substantially directly to the cylinders of group II.

The steam pressure of the clean steam is raised to a pressure p5 equal to $P_{III}$ by means of the compressor 25 located in the steam feeding line f, whereby the steam group III can be fed at the appropriate pressure through the line f3. An additional compressor 26 along the main line f modifies the steam pressure so as to maintain the pressure leading towards the fourth steam group at a level p6 equal to $P_{IV}=2.0$ bar.

Thus, the steam pressure extracted from the thermomechanical pulp process in accordance with the present invention is only raised to additional pressure as is required. Specifically, only the steam applied to the cylinder groups III and IV require a higher pressure than the one provided by the lower pressure steam generator 24.

It should be appreciated, that most of the system described for the paper machine process is well known and only the intake of steam and outlet of condensate are shown diagramatically for simplicity of explanation of the present invention. In accordance with the figure described, the thermal system also includes a power plant 40 from which the steam is continuously introduced, or as is required. The steam flows through line g and through the pressure reduction valves 33, 34 and 35 so as to have steam of appropriate pressure levels available at each of the steam feeding lines f1, f2, f3 and f4 either continously, or as is required. The pressure reduction valves 33, 34 and 35 are equipped with automatic pressure regulators, as is well known.

The condensate container 31 receives condensate coming from the drying cylinders of the drying section 30 which is directed along line k to the condensate tank. This tank is connected through the pump 32 and the line h back to the power plant. It is also connected through the line 1 and the pump 28 to the heat exchanger 22. The scrubbing water outlet from the steam scrubber 21 is shown as leaving along line b and the condensate outlet of the heat exchanger 22 leaves along line c.

Figure 2:
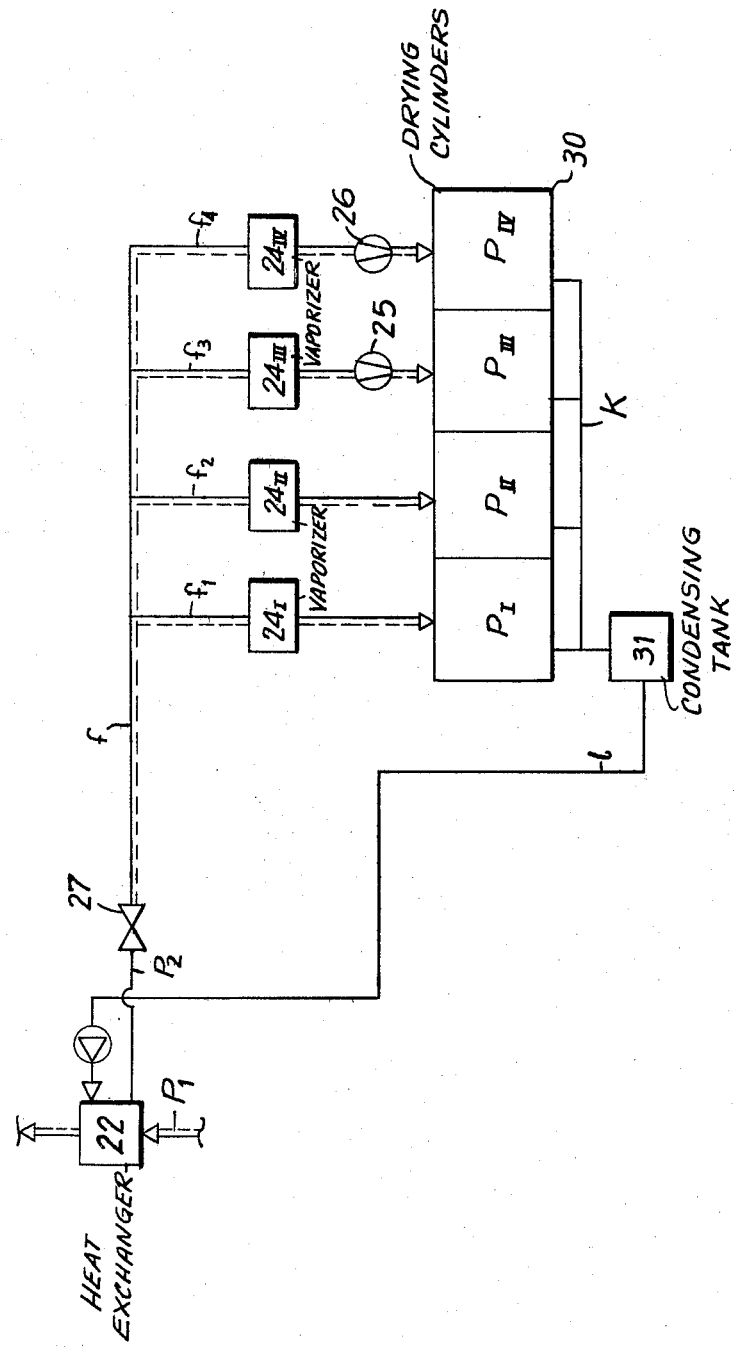
FIG. 2 schematically represents a block diagram of another embodiment of a thermomechanical pulp plant and a drying section of a paper manufacturing machine according to the present invention omitting for purposes of clarity structure which is identical to that illustrated in FIG. 1.

In accordance with the present invention, thermal energy can be taken from the thermomechanical pulp plant 10 to the dryer section 30 of the paper machine either as low pressure steam or as hot water. When it is provided as low pressure steam, such steam is generated at the thermomechanical pulp plant 10. When it is provided as hot water the hot water is vaporized at the drying section 30. Thus, referring to FIG. 2, the steam generated in the thermomechanical pulp process is directed at a pressure $P_1$ into the heat exchanger 22 wherein its thermal energy is transferred to clean water which is circulated by means of the pump 28. However, rather than the clean water being directed into a single vaporizer 24 as is the case in the embodiment illustrated in FIG. 1, the clean water is directed through the pressure reduction valve 27 to the drying section 30 through line f, the line f being subdivided into the four branches $f_1$, $f_2$, $f_3$ and $f_4$. In each of these branches, a vaporizer $24_I$, $24_{II}$, $24_{III}$, and $24_{IV}$, respectively is located so that the clean water is vaporized in each. As in the case of the FIG. 1 embodiment, the steam produced in lines $f_1$ and $f_2$ can be fed directly to the groups I, and II with appropriate adjustments being effected to reduce the pressure of the clean steam for group I and for preferably applying the clean steam to group II substantially directly. The pressure of the clean steam exiting from vaporizers $24_{III}$ and $24_{IV}$ are raised to appropriate respective levels by means of compressers 25, 26 located in lines $f_3$ and $f_4$. In this manner, the hot water from the heat exchanger 22 is applied to the drying section 30 and is vaporized in the drying section in a plurality of vaporizers each of which produces clean steam at a respective different pressure.

When the present invention is applied to paper mills utilizing several paper machines for each thermomechanical pulp plant, a favorable situation can be obtained whereby substantial thermal recovery is achieved. The steam collected as aforedescribed can be utilized for the first low pressure groups of each drying section. In this case, those steam groups for which there is insufficient steam recovered with the procedure of the present invention, can be supplied with steam provided by the normal steam generating procedures. For example, a back pressure steam from the power plant can be utilized for the higher pressure steam groups. This steam generating procedure can also be utilized to substitute for steam recovered from the thermomechanical pulp plant during interruption.

The present invention provides both a technically and economically feasible solution for utilizing large quantities of heat generated during thermomechanical pulp production in order to dry paper in the form of lower pressure steam. It is based upon the idea that the pressure of the steam need only be raised as is required. As a result, the arrangement can be made even more practical by connecting it together with an additional steam generating system, such as the back pressure power station described.

Various other variations and modifications from the embodiments described can also be included. For example, the heat exchanger 22 and the vaporizer 24 may be constructed as an integral unit or as two separate units, as described. Also, several parallel vaporizers can be utilized to produce steam at different pressures. Each of them may then be fed into a surface steam feeding group of the dryer section without the need for raising the pressure and preferably without lowering the pressure.

It should also be appreciated that the number of stations, the pressure indicated, etc. were only exemplary and modifications can easily be made.

There has been disclosed heretofore the best embodiments of the invention presently contemplated. However, it is to be understood that various changes and modifications may be made thereto without departing from the spirit of the invention.

What is claimed is:

1. A method of recovering the thermal energy contained in the pressurized process steam generated by a plant in the production of thermomechanical pulp, by utilizing it in the drying section of a paper manufacturing machine, said method comprising the steps of:
    (a) applying the process steam to the primary side of a heat exchanger;
    (b) applying water to the secondary side of the heat exchanger to produce hot water;
    (c) vaporizing the water to produce clean steam; and
    (d) utilizing the clean steam to at least a first steam group of the drying section of the paper manufacturing machine, without increasing pressure.

2. The method of claim 1, wherein said vaporizing is achieved within the heat exchanger.

3. The method of claim 1, wherein said vaporizing is achieved in a separate vaporizer unit.

4. The method of claim 1, wherein said clean steam is applied to said drying section in conjunction with an additional steam generating device.

5. The method of claim 1, wherein the hot water from the heat exchanger is applied to the drying section and is vaporized in the drying section.

6. The method of claim 1, wherein the hot water is vaporized prior to applying it to the drying section.

7. The method of claim 1, and further comprising the step of raising the pressure of the steam only for application to at least the last steam group of the drying section.

8. The method of claim 1, wherein the process steam from the thermomechanical pulp plant is utilized by a plurality of paper manufacturing machines by applying the clean steam to at least the first section of each of their respective drying sections.

9. The method of claim 1, wherein said water which is vaporized to produce clean steam is provided from water condensed from said drying section.

10. The method of claim 9, and further comprising the step of pumping the condensed water into the heat exchanger.

11. The method of claim 1, wherein the water is sent to a plurality of vaporizers each producing clean steam at a respectively different pressure, whereby the clean steam at different pressures is applied to corresponding steam groups of the drying section.

* * * * *